March 14, 1944.  H. GOY  2,344,351
GANGWAY CONNECTION BETWEEN TWO VEHICLES COUPLED TO EACH OTHER,
PARTICULARLY FLEXIBLE GANGWAY-BELLOWS FOR RAILWAY CARRIAGES
Filed June 3, 1940  4 Sheets-Sheet 1
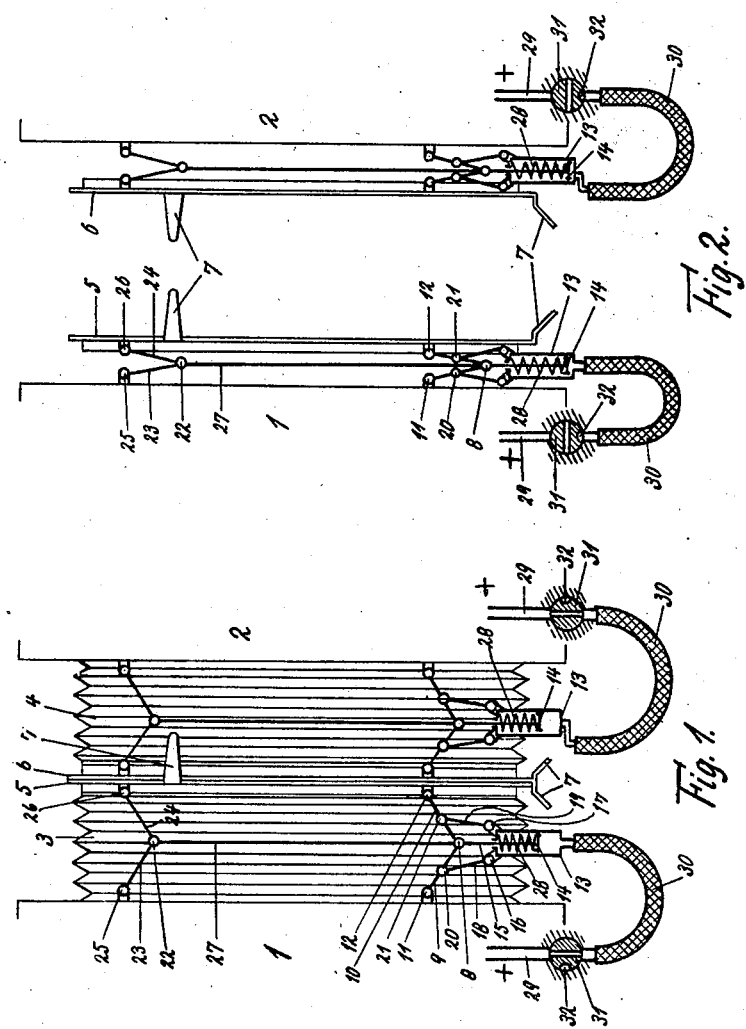
Inventor:
Herbert Goy March 14, 1944. H. GOY 2,344,351
GANGWAY CONNECTION BETWEEN TWO VEHICLES COUPLED TO EACH OTHER,
PARTICULARLY FLEXIBLE GANGWAY-BELLOWS FOR RAILWAY CARRIAGES
Filed June 3, 1940 4 Sheets-Sheet 2
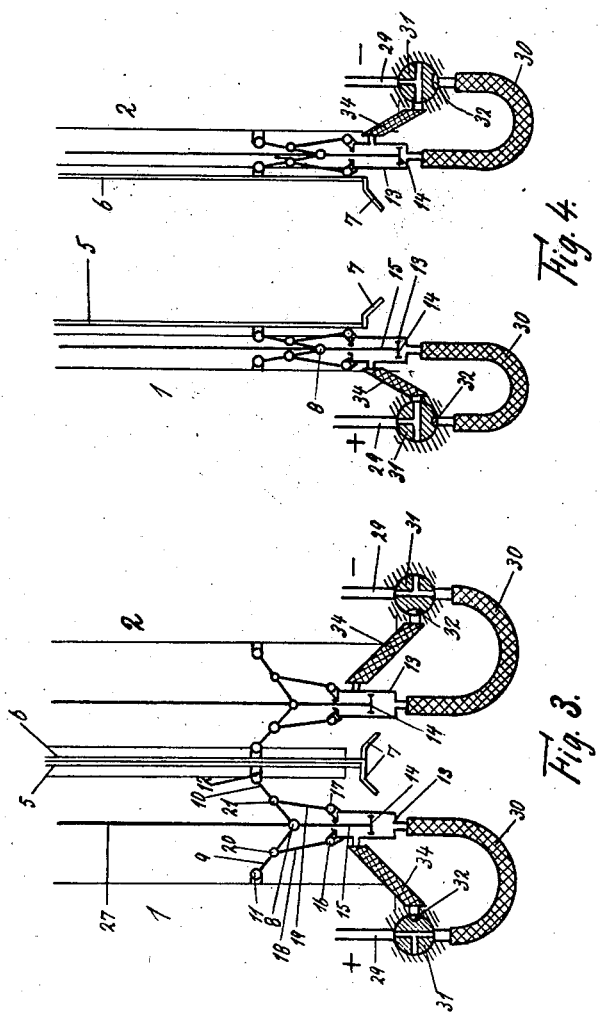
Inventor:
Herbert Goy March 14, 1944. H. GOY 2,344,351
GANGWAY CONNECTION BETWEEN TWO VEHICLES COUPLED TO EACH OTHER, PARTICULARLY FLEXIBLE GANGWAY-BELLOWS FOR RAILWAY CARRIAGES
Filed June 3, 1940 4 Sheets-Sheet 3

Inventor:
Herbert Goy
by Jas Suivre
Atty.

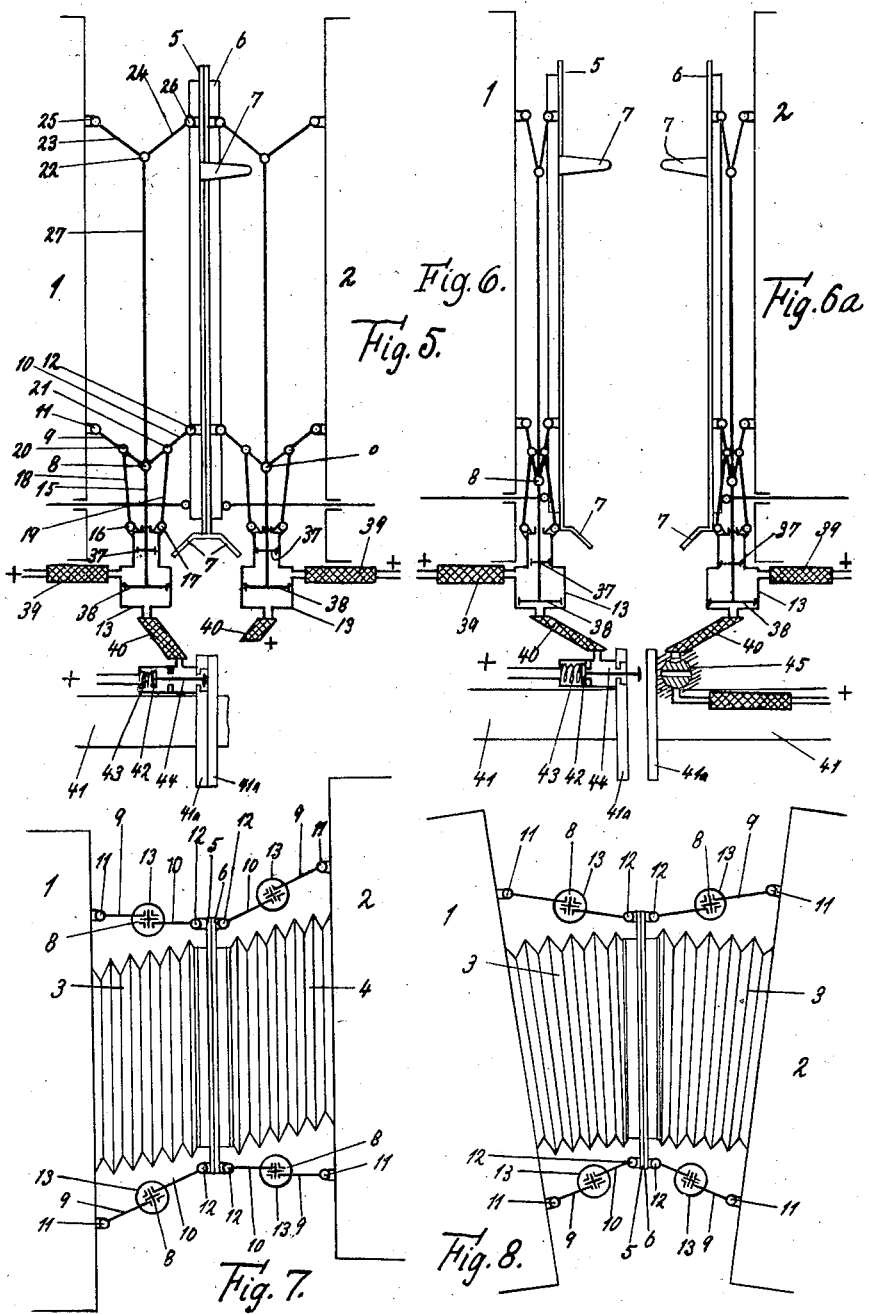

Patented Mar. 14, 1944

2,344,351

UNITED STATES PATENT OFFICE 2,344,351

GANGWAY CONNECTION BETWEEN TWO VEHICLES COUPLED TO EACH OTHER, PARTICULARLY FLEXIBLE GANGWAY BELLOWS FOR RAILWAY CARRIAGES

Herbert Goy, Berlin-Tempelhof, Germany; vested in the Alien Property Custodian

Application June 3, 1940, Serial No. 338,670
In Germany May 25, 1937

8 Claims. (Cl. 105—11)

The invention relates to a gangway connection between two vehicles coupled to each other, in particular to flexible gangway-bellows for railway carriages.

Hitherto, the known type of gangway connections, in particular gangway-bellows for railway carriages, were connected or disconnected by hand, which was not only difficult and dangerous, but time consuming. This work was particularly difficult when the vehicles were standing on a curve.

As compared with known devices, the invention principally consists of extending rods for opening and closing the gangway-bellows, with such rods attached at one end to the vehicle and at the other end to the frame of the gangway connection. The extending rods are connected to a piston operated by pressure and controlled by valves or by valves and springs. Thus, the difficult and dangerous connecting of the bellows by hand is avoided, and at the same time a damping is obtained between the coupled vehicles, preventing their hunting motion in a high degree without requiring special means therefor.

Figure 9:
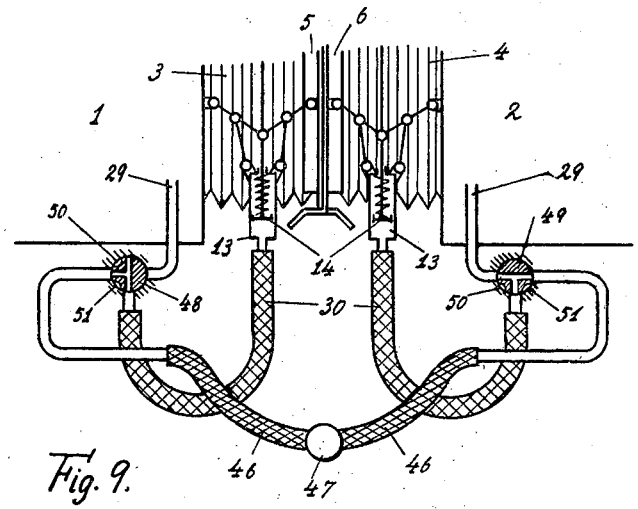
Figure 10:
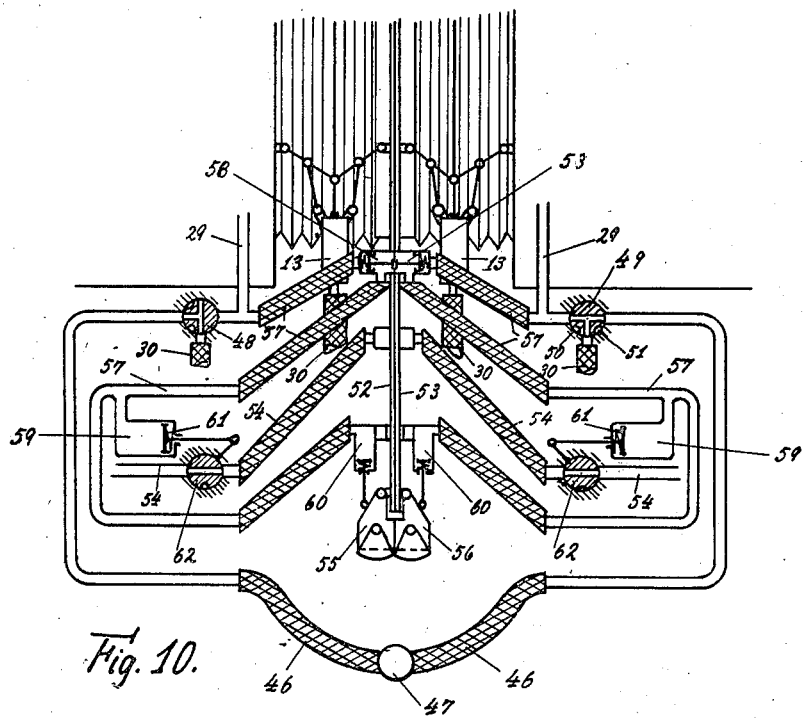

In the accompanying drawings:

Fig. 1 is a diagrammatical side view of the flexible gangway-bellows with the extending rods in closing position, Fig. 2 is the same view with opened bellows, Figs. 3 and 4 are side views of another constructional form with closed and opened bellows, Fig. 5 is a side view of a third constructional form with completely automatic operation with closed bellows, Fig. 6 is a view similar to Fig. 5 showing one bellows only and in open position, Fig. 6ª shows the cooperating bellows with a conventional type of control valve, Figs. 7 and 8 are two diagrammatical plan views illustrating the oscillation of the carriages with respect to each other on a straight line and on a curve, Fig. 9 is a partial diagrammatical side view of a further constructional form of the bellows according to the invention, Fig. 10 is a similar side view suitable for coupling additional pipe lines or the like.

The gangway connection between the vehicles 1 and 2 consists in known manner, for example, of bellows whose halves 3 and 4 are attached to each of the vehicles and are brought together, and of the frame parts 5 and 6 which may be guided by bent horns 7 or the like. In all constructional examples the type of extending rods is the same, but of course these rods may be constructed in any other way, it only being necessary to operate them by pressure.

The extending rods, provided on both sides of the gangway bellows 3 and 4, consist of two rigid rods 9 and 10 forming an angle and movably connected in a vertical plane by a joint 8. The rod 9 may turn on the point 11 at the vehicle in all directions and the rod 10 may turn on the point 12 on the frame 5 or 6 in all directions. To the joint 8 there is attached a piston rod 15 guided in a casing 13 and connected with a piston 14, whereas there are attached to the piston casing 13 at the points 16 and 17 rigid rods 18 and 19 capable of turning at these points as well as in the points 20 and 21 connecting these rods with the extending arms 9 and 10. When the piston 14 moves in one direction or the other, the bellows 3 and 4 are closed or opened by the extending rods described above.

The extending rods may be attached at half the height of the bellows to the vehicles 1 and 2 as well as to the frames 5 and 6, or preferably at the lower portion of the bellows to the vehicle and to the frame. In order to ensure a uniform opening and closing motion, an extending device consisting of two rods 23 and 24 movably connected at the point 22 is also provided at the upper end of the bellows, the rods 23 and 24 being connected at the points 25 and 26 to the vehicle and to the frame of the bellows so as to turn at these points. The connecting joint 22 is connected by a rigid rod 27 with the connecting joint 8 of the lower extending rods. The angular position of the rods 23, 24 must correspond to that of the rods 9, 10 of the lower extending rods.

The individual elements of the extending rods for the vehicle 2 correspond to those of the vehicle 1 so as to fit together, the respective reference numerals being only partly given on the right halves of the figures for the sake of clearness.

According to the example illustrated in Figs. 1 and 2, the motion of the extending rods is effected as follows. A flexible branch pipe 30 connected to a compressed air pipe line 29 leads into the piston casing 13 below the piston 14 which is loaded by a spring 28. In the compressed air piping 29 there is inserted a stop cock 31, which is shown in opened position in the left half of Fig. 1, so that the compressed air may act upon the piston 14 in the casing 13. The piston 14 is then pressed upwards against the pressure of the spring 28 whereby the arms 9, 10, and 23, 24 are extended and press the bellows 3 against the bellows 4 of the second carriage 2 whose bellows 4 are moved in the same manner.

If the gangway is to be disconnected, the cock 31 is closed (as shown in the left half of Fig. 2). In this position, the branch pipe 30 is without pressure which is effected, for example, by providing in the plug of the cock 31 a circumferential groove 32 in the direction of the turning axis of the cock 31, which groove is connected on the one hand with the open air and on the other hand in the illustrated position with the branch pipe 30. Thus, the spring 28 may act with full force upon the piston 14 and press the latter back, whereby the opening motion of the bellows is effected via the extending rods.

According to the example illustrated in Figs. 3 and 4, two flexible branch pipes 34 and 30 are connected to the casing of a three-way cock 31 inserted in the compressed air piping 29, one of the two flexible branch pipes leading above and the other below the piston 14 in the casing 13. In the closing position of the bellows (Fig. 3), there will be pressure in the branch pipe 30, whereby the piston 14 is moved upwards, the pressure in the branch pipe 34 being removed at the same time owing to the fact that, as described above, the plug of the three-way cock 31 is provided with a groove 32 leading into the open air and connected to the piping 34. In the opening position (Fig. 4) in which the three-way cock 31 is turned by 90°, there will be pressure in the branch pipe 34, whereas the groove will remove the pressure in the pipe 30. Thus, the piston 14 is moved downwards and the bellows 3 are folded by the extending rods.

The valves of the cock 31 according to the two examples illustrated in Figs. 1 to 4 may be operated either manually or automatically, the operation in the latter case, when coupling or uncoupling the two carriages to be connected, being effected by any kind of control gear.

An example of a gangway connection with automatic closing and opening motion of the flexible bellows is illustrated in Figs. 5 and 6: In this case, a differential piston is used with two pistons 37 and 38 of different diameters. When using compressed air the pressure pipe leads in through a branch 39 between the two pistons 37 and 38, whereas a second branch 40 leads into the piston casing 13 below the piston 38 with the larger diameter. In the branch 40 there is provided a valve on the coupling part 41 for the carriages 1 and 2, the valve spring retainer 42 being pressed on one side by a spring 43 and having on the other side a valve gear rod 44, extending in the closing position of this valve beyond the outer surface of the buffer 41a of the carriage coupling. In this example there is constant pressure in the branch pipe 39, whereas the pipe 40 is only kept under pressure when the gangway connection is being closed or is in closed position, as the valve 42 is opened by the valve gear rod 44, which is pressed back when the carriages are being coupled. The pressure from pipe 39 acts on the differential pistons 37 and 38, and in the absence of counterpressure would tend to move the pistons to separate the gangways.

When the valve 42 is open, however, as when the cars are coupled, pressure through pipe 40 acts on piston 38 alone and in opposition to the pressure thereon through pipe 39. Under these conditions, the pressure through pipe 39 on piston 37 will prevail, and the rods are operated upwardly to close the gangways. Thus the pressure through pipe 40 governs the control of the opening and closing of the gangways, and as pressure flow through pipe 40 is automatically controlled by the coupling and uncoupling of the cars, the appropriate operation of the gangways is thus correspondingly automatic.

The extending rods operated by compressed air with the piston acted upon by pressure at the same time serve as a perfect vibration damper for the two coupled carriages, as in the motions of the carriages with respect to each other the extending rods with the movable piston will yield elastically. In order to damp such vibrations in a particularly favorable manner, the pivotal points 11 of the extending rods are connected to the carriages at points relatively greatly laterally spaced from the corresponding sides of the bellows, while the pivotal points 12 of the extending rods are connected to the frames 5 and 6 at points relatively closely laterally spaced therefrom.

In order to make it possible that the two bellows 3 and 4 are operated simultaneously and that their frames 5 and 6 thus meet half way between the two carriages 1 and 2, the two compressed air pipe lines 29 of the two carriages are connected directly with each other by flexible conduits 46, for example by a hose coupling 47, and the hose couplings 30 leading to the piston cylinders 13 are branched off the pressure pipe lines 29. At the branch points there are inserted three-way cocks 48 and 49. Instead of the three-way cocks there may be provided other control gears, such as step valves.

In the opened position of the bellows, both three-way cocks 48 and 49 are in such a position that the connecting pipe 46 as well as the branch pipes 30 are closed with respect to the pressure pipe line 29. Now, if the bellows are to be closed, only one of the three-way cocks, for example the cock 49, is turned by 90° as shown in Fig. 1, so that there is pressure in the connecting pipe 46 as well as in the two branch pipes 30, the two halves of the bellows being closed by the moving pistons 14 and the extending rods in the manner described. When the bellows are being opened, the cock 49 is turned back by 90°, and in order that the pressure in the pipes 46 and 30 may be removed, the cocks are provided with two longitudinal grooves 50 and 51, which communicate with the open air. By these grooves the pressure in the pipes 46 and 30 is removed in an intermediate position of the cock 49 (turned by 45°), so that the springs 28 of the pistons 14 become effective.

Together with the closing of the bellows 3, 4, it is also possible to couple water or steam pipes or electric cables. For this purpose, the frames 5 and 6 of the bellows are provided, as shown in Fig. 10, with lower flanges 52 and 53 which, in the closing position, touch each other with their outer surfaces. The ends of the water or steam pipes 54 lead into these flanges; and furthermore contact boxes 55 and 56 for cables (not illustrated) are pivotally connected at the lower ends of the flanges. For making the connections, pipes 57 with inserted push valves 58 are branched off the pressure pipe lines 29. The push valves 58 open when the bellows close, and pressure is caused via the pipes 57 in two parallel cylinders 59 and 60. The spring-controlled piston 61 in the cylinder 59 turns a stop cock 62 in the water pipe 54 by means of a piston rod and an arm, and the spring actuated piston 63 in the cylinder 60 oscillates the contact boxes 55 and 56, so as to effect the necessary water, steam, and electrical connections between adjacent cars.

What is claimed, is:

1. Means for operating a bellows-type gangway connection between adjacent railway cars, said gangway connection including a pair of bellows each having upper and lower toggle connections connected between them and the related car, a rod operatively connecting the upper and lower toggle connections for assuring their similar and simultaneous operation, a link connected to the lower toggle connection, and manually controlled pressure means for operating said link, said pressure means comprising a cylinder suspended from the lower toggle connection, a piston working in the cylinder and operatively connected to said link, and manual means for admitting pressure into the cylinder.

2. A gangway connection of the bellows type for use as a car vestibule between adjacent carriages including at least one toggle provided on the side of each bellows, the toggle being pivotally connected to and between the carriage and the frame of the bellows, a toggle-supported cylinder, a piston operative within the cylinder, a link between the piston and joint of the toggle, an air pressure conduit opening into the cylinder, and a valve carried by the conduit for admitting air pressure to the cylinder for operating the piston.

3. Means for operating a bellows type gangway connection between two adjacent railway cars, said connection including a bellows mounted on each car and a toggle connected to and between the corresponding car and the corresponding bellows, a link operatively connected to the toggle, and controllable pressure means for operating the link, said pressure means having a piston operatively connected to said link, a cylinder in which said piston works, a pressure supply pipe, conduits leading into the cylinder on opposite sides of the piston respectively, and means for controlling pressure admission from the supply pipe to either side of the piston at will, whereby the bellows may be pressure operated in either direction.

4. Means for operating a bellows type gangway connection between two adjacent railway cars, said connection including a bellows mounted on each car and a toggle connected between the car and an outer portion of the bellows, a link operatively connected to the toggle to extend the bellows, and controllable pressure means for operating the link, said pressure means comprising a differential piston connected to the link, a cylinder for the piston, a first means for admitting pressure to the cylinder to influence differential piston movement in one direction, and a second means to admit pressure to a selected portion of the cylinder to partially balance the said piston-moving influence of the first mentioned pressure and cause such first mentioned pressure to move the piston in the opposite direction.

5. Means for operating a bellows type gangway connection between two adjacent railway cars, said connection including a bellows mounted on each car and a toggle connected between the car and an outer portion of the bellows, a link operatively connected to the toggle to extend the bellows, and controllable pressure means for operating the link, said pressure means comprising a differential piston connected to the link, a cylinder for the piston, a first means for admitting pressure to the cylinder to influence differential piston movement in one direction, and a second means to admit pressure to a selected portion of the cylinder to partially balance the said piston-moving influence of the first mentioned pressure and cause such first mentioned pressure to move the piston in the opposite direction, said second pressure means being automatically controlled in the coupling and uncoupling of the cars.

6. Means for operating a bellows type of gangway connection between two adjacent railway cars, said connection including a bellows mounted on each car and a toggle connected between the car and an outer portion of the bellows, a link operatively connected to the toggle to extend the bellows, and controllable pressure means for operating the link, said pressure means including air pressure conduits of the two adjacent cars capable of being detachably connected to each other, branch lines in respective communication with the air pressure conduits, and a control device for each branch line, either control device operating to charge the air pressure conduit when the bellows is open and to operate the piston cylinders of both bellows.

7. Means for operating a bellows type gangway connection between two adjacent railway cars, said connection including a bellows mounted on each car and a toggle connected to and between the car and an outer part of the bellows, a link operatively connected to the toggle to extend the bellows, controllable pressure means for operating the link coupling elements for service conduits on the adjacent cars, said coupling elements being arranged to be connected in the closing of the bellows of such cars, and valves for establishing communication between similar coupled conduits, with said valves controlled by the pressure means for operating the bellows.

8. Means for operating a bellows type gangway connection between two adjacent railway cars, said connection including a bellows mounted on each car and a toggle connected to and between the car and an outer part of the bellows, a link operatively connected to the toggle to extend the bellows, controllable pressure means for operating the link terminal contacts for electrical service conductors of the adjacent cars, said terminal contacts being pivotally supported on bellows extensions of such adjacent cars to be brought into adjacent relation in the closing movement of such bellows, and means responsive to the bellows-closing pressure to swing said terminal contacts into electrical engagement.

HERBERT GOY.